(12) United States Patent
Liou

(10) Patent No.: US 8,118,272 B2
(45) Date of Patent: Feb. 21, 2012

(54) LINK ROD TYPE ADJUSTABLE SCREEN FIXING APPARATUS

(75) Inventor: Jen-Jia Liou, Taipei County (TW)

(73) Assignee: Portwell Inc., Jhonghe, Taipei County (TW)

( * ) Notice: Subject to any disclaimer, the term of this patent is extended or adjusted under 35 U.S.C. 154(b) by 767 days.

(21) Appl. No.: 12/232,412

(22) Filed: Sep. 17, 2008

(65) Prior Publication Data

US 2010/0067185 A1 Mar. 18, 2010

(51) Int. Cl.
*E04G 3/00* (2006.01)

(52) U.S. Cl. .............. 248/287.1; 248/274.1; 248/276.1; 248/295.11; 248/299.1; 248/309.1; 248/231.21; 248/176.3; 248/346.06

(58) Field of Classification Search .................. 348/836, 348/837, 838, 839, 840, 841, 842; 248/346.03, 248/274.1, 276.1, 298.1, 309.1, 231.21, 176.3
See application file for complete search history.

(56) References Cited

U.S. PATENT DOCUMENTS

| | | | | |
|---|---|---|---|---|
| 5,582,378 A * | 12/1996 | Fusi | ............................ | 248/277.1 |
| 6,206,426 B1 * | 3/2001 | Azzato | ............................ | 281/45 |
| 7,272,984 B2 * | 9/2007 | Fan | ............................... | 74/89.17 |
| 7,401,756 B2 * | 7/2008 | Lien et al. | ................. | 248/346.07 |
| 7,537,190 B2 * | 5/2009 | Fan | ............................. | 248/309.1 |
| 7,967,269 B2 * | 6/2011 | Liu | ............................. | 248/287.1 |
| 2006/0278788 A1 * | 12/2006 | Fan | ............................ | 248/309.1 |
| 2007/0040089 A1 * | 2/2007 | Shiff | ............................. | 248/448 |
| 2007/0284500 A1 * | 12/2007 | Fan | ......................... | 248/346.06 |
| 2011/0149180 A1 * | 6/2011 | Ichioka et al. | ................ | 348/836 |

* cited by examiner

*Primary Examiner* — Jeanette E Chapman
*Assistant Examiner* — James Buckle, Jr.
(74) *Attorney, Agent, or Firm* — Muncy, Geissler, Olds & Lowe, PLLC

(57) ABSTRACT

A link rod type adjustable screen fixing apparatus includes: a fixing base, having at least one operating slot; at least one distal plate device, having at least one pair of distal plates embedded in the operating slot, and slidably moving in the operating slot, and an upper frame plate disposed at an external side of the distal plate; at least one contractible device, formed by pivotally coupling link rods, and installed in the operating slot, and a side of the contractible device being pivotally coupled to the distal plate; and a containing space, defined by the upper frame plate of the distal plates for installing a screen. The distal plate is contractible in the operating slot for adjusting the containing space, such that the invention can fit screens of different sizes, and provide a convenient replacement and a dynamic adjustment.

17 Claims, 6 Drawing Sheets

LINK ROD TYPE ADJUSTABLE SCREEN FIXING APPARATUS

BACKGROUND OF THE INVENTION

1. Field of the Invention

The present invention relates to a link rod type adjustable screen fixing apparatus, and more particularly to a screen fixing apparatus flexibly installed around the periphery of a screen for changing the size and form of the screen to provide a very convenient and cost-effective apparatus with an easy and efficient installation.

2. Description of the Related Art

Electronic multimedia is generally used for advertising, and screen becomes a mainstream of such electronic advertising with dynamic multimedia audio/video effects. With reference to FIG. 1 for a structure of a conventional screen fixing base, the screen fixing base comprises: a fixing base 90, having a frame 91 and an embedding space 92 defined by the frame 91. When the structure is used, the fixing base 90 is mounted onto or embedded into a wall 100, and a screen 93 is installed and fixed at an embedding space 92 of the fixing base 90, such that the screen 93 can be used for audio and video advertising or propagandas. Although the fixing base 90 can achieve the effect of containing and positioning the screen 93, there are drawbacks, such as if the area or size of the screen 93 cannot meet the actual need and the fixing base 90 no longer can be used, it is necessary to exchange or expand the screen 93, or else the fixing base 90 will become a waste. The prior art is not cost-effective, or even causes an environmental issue for the disposal. If it is necessary to change the size of a screen 93 with a changed fixing base 90, the fixed base 90 has to be changed again. Obviously, the design of the structure of the conventional screen fixing base is not good enough. Therefore, it is an important subject for related manufacturers to develop a cost-effective screen fixing apparatus to overcome the shortcomings of the prior.

In view of the foregoing shortcomings of the conventional screen fixing base and its structural design, the inventor of the present invention based on years of experience in the related industry to develop a convenient and cost-effective link rod type adjustable screen fixing apparatus to serve the general public and promote the related industry.

SUMMARY OF THE INVENTION

Therefore, it is a primary objective of the present invention to provide a link rod type adjustable screen fixing apparatus extended or contracted from the periphery of the fixing base to fit screens of different sizes, and cover a larger range of generality to prevent the manufacturing and inventory issues of fixing bases of different sizes, so as to give better economic benefits to its manufacture.

Another objective of the present invention is to provide a link rod type adjustable screen fixing apparatus capable of changing a screen of a different size conveniently and adjusting the screen dynamically, so as to provide better economic benefits to its use.

To achieve the objectives and effects of the present invention, the technical measures taken by the invention comprises: a fixing base, having at least one operating slot; at least one distal plate device, having at least one pair of distal plates, embedded into and positioned at the operating slot for sliding and moving correspondingly, and an external side of the distal plate having an upper frame plate; at least one contractible device, formed by pivotally coupling a plurality of link rods and installed in the operating slot, and a side of the contractible device being pivotally coupled to the distal plate; and a containing space, defined by upper frame plates of the pair of distal plates, for installing a screen.

The technical measure of the link rod type adjustable screen fixing apparatus further comprises: a fixing base, having two operating slots; two distal plate devices, having two first distal plates and two second distal plates, and the first distal plate and the second distal plate being positioned at the two operating slots respectively for sliding and moving, and external sides of the first distal plate and the second distal plate having an upper frame plate separately; a contractible device, having a first contractible device and a second contractible device installed in the two operating slots respectively, and the first contractible device and the second contractible device being formed by pivotally coupling a plurality of link rods, and a side of the first contractible device being pivotally coupled to the first distal plate, and a side of the second contractible device being pivotally coupled to the second distal plate; and a containing space, defined by upper frame plates of the pair of first distal plates and second distal plates for installing a screen.

To make it easier for our examiner to understand the technical characteristics and effect of the present invention, we use preferred embodiments with accompanying drawings for the detailed description of the invention as follows:

DETAILED DESCRIPTION OF THE PREFERRED EMBODIMENTS

Figure 1:
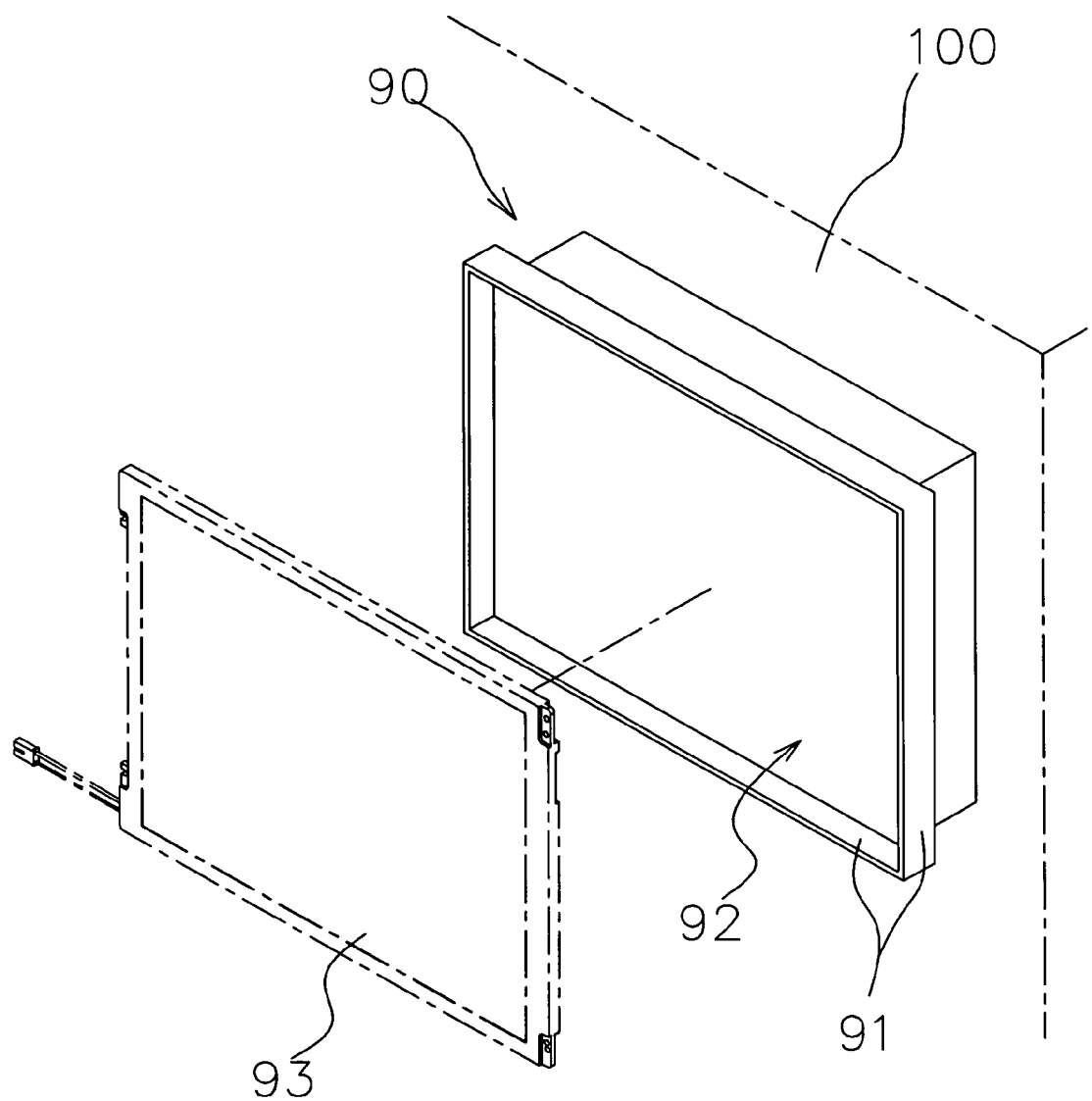
FIG. 1 is a schematic view of a structure of a screen fixing base in accordance with a prior art.
Figure 2:
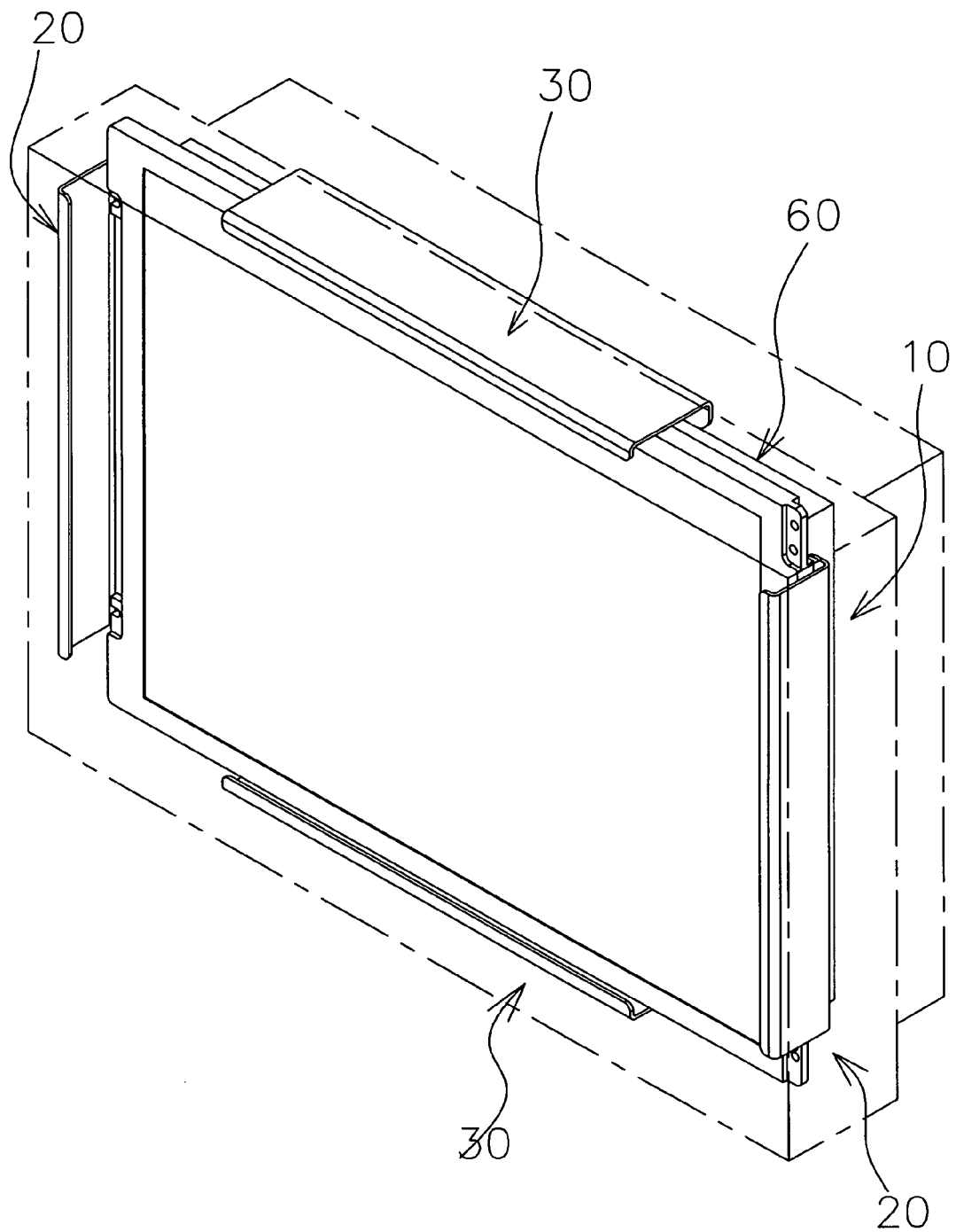
FIG. 2 is a perspective view of the present invention.
Figure 3:
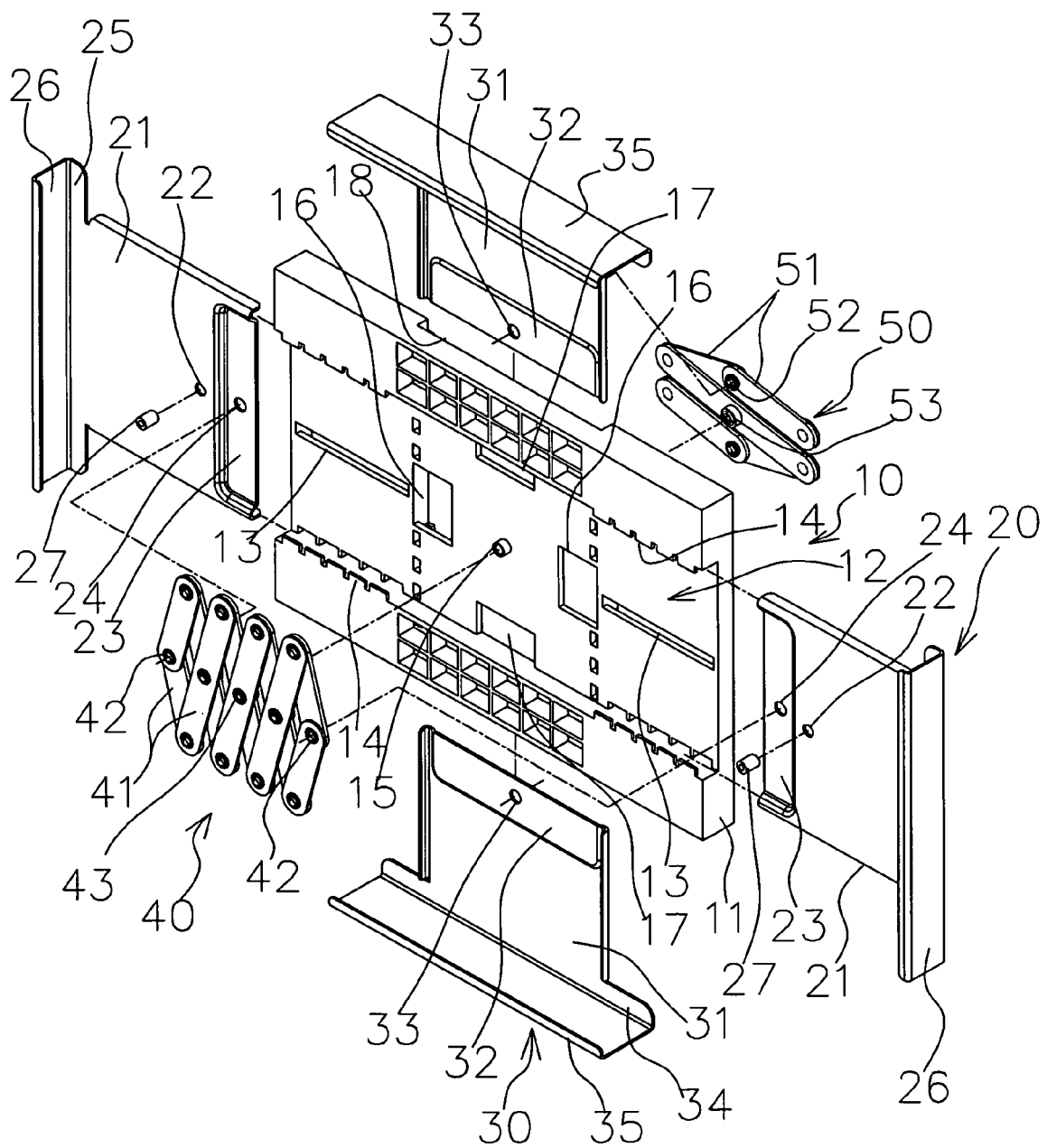
FIG. 3 is an exploded view of the present invention.
Figure 5:
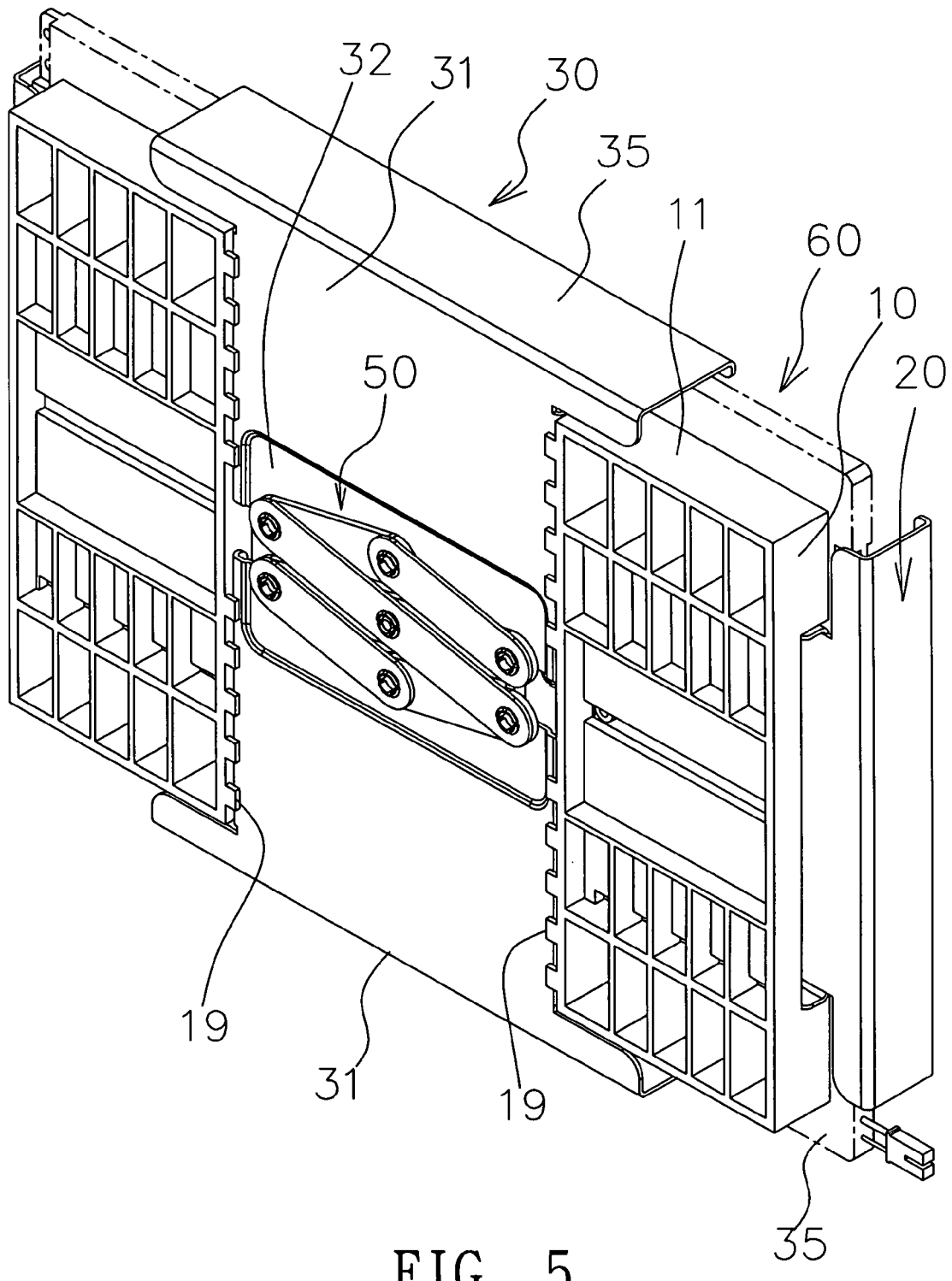
FIG. 5 is a schematic view of installing a second contractible device in accordance with the present invention.

With reference to FIGS. 2 and 3, a link rod type adjustable screen fixing apparatus of the invention comprises: a fixing apparatus 10, a first distal plate device 20, a second distal plate device 30, a first contractible device 40 and a second contractible device 50, wherein the fixing apparatus 10 includes a fixing base 11 substantially in the shape of a plate, and having a transversal concave operating slot 12 at the middle of a side (a front side); a bar-shaped embedded slide slot 13 disposed separately on both sides of the operating slot 12; a positioning pillar 15, disposed at the middle of the operating slot 12; a limit slot 16, 17, disposed transversally and longitudinally on both sides of the positioning pillar 15; a serrated press plate 14 disposed separately on both left and right sides of the fixing base 11 corresponding to connecting position of the operating slot 12 and extended towards the operating slot 12; a transversal concave operating slot 18 disposed at the middle of another side (such as the rear side) of the fixing base 11; and a serrated press plate 19 disposed both upper and lower sides of the fixing base 11 corresponding to the connecting position of the operating slot 18 and protruded towards the operating slot 18 (as shown in FIG. 5), and the positioning pillar 15 being protruded from the middle of the operating slot 18.

The first distal plate device 20 includes two symmetrical left and right first distal plates 21, and the first distal plate 21 has a positioning hole 22 and a concave surface 23 disposed at an internal side (according to the assembling direction), and the concave surface 23 has a pivotal connecting hole 24, and an external side of the first distal plate 21 has a lower frame plate 25 coupled to an upper frame plate 26.

The second distal plate device 30 includes two symmetrical upper and lower second distal plates 31, and the second distal plate 31 has a concave surface 32 disposed at an internal side (according to the assembling direction), and the concave surface 32 has a pivotal connecting hole 33, and an external side of the second distal plate 31 has a lower frame plate 34 coupled to an upper frame plate 35. The upper frame plates 26, 35 at four sides are used for defining a space for containing and installing a screen 60 (which is an LCD screen in this embodiment).

The first contractible device 40 is formed by pivotally coupling a plurality of link rods 41 (which is in the shape of a sheet in this embodiment) for providing a transversal pulling and contracting effect, and the first contractible device 40 includes a distal pivotal connecting portion 42 disposed separately on both left and right sides (in a transversal direction) and a middle pivotal connecting portion 43 disposed at the middle. The second contractible device 50 is formed by pivotally coupling a plurality of link rods 51 for providing a longitudinal pulling and contracting effect, and the second contractible device 50 has a distal pivotal connecting portion 52 disposed separately on both upper and lower sides (in a longitudinal direction) of the middle of a middle pivotal connecting portion 53.

Figure 4:
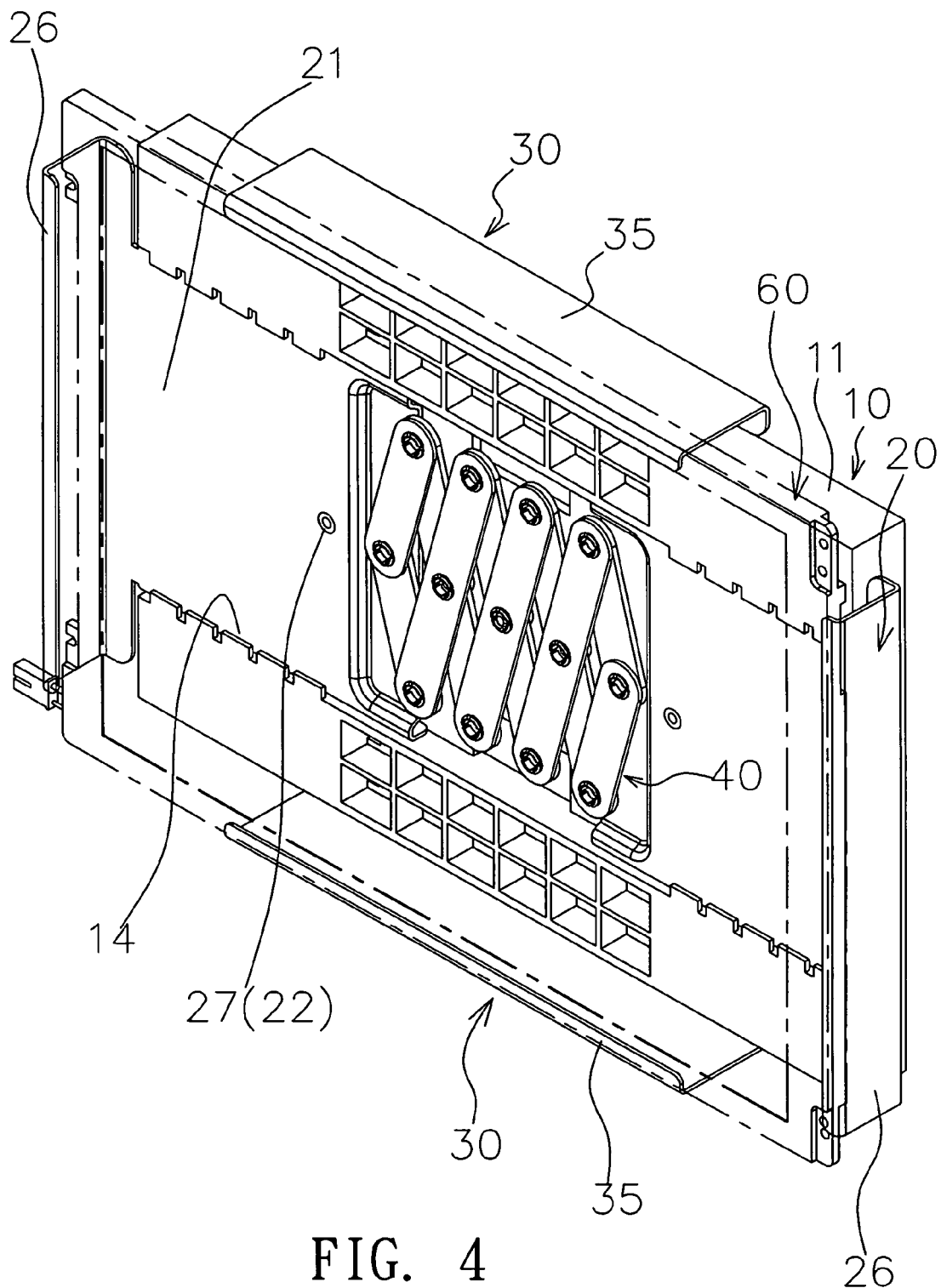
FIG. 4 is a schematic view of installing a first contractible device in accordance with the present invention.

With referenced to FIG. 4 together for assembling a link rod type adjustable screen fixing apparatus in accordance with the present invention, the two symmetrical left and right first distal plates 21 are embedded transversally into both sides of the operating slot 12, and the first contractible device 40 is disposed at the middle of the operating slot 12, and the first distal plate 21 is installed into the embedded slide slot 13 of the fixing base 11 by passing a rod bolt 27 into the positioning hole 22, such that the first distal plate 21 can be slid and moved in the operating slot 12 according to the embedded slide slot 13, and the first distal plate 21 is abutted by the press plate 14 and limited in the operating slot 12; a middle pivotal connecting portion 43 of the first contractible device 40 is pivotally coupled to the positioning pillar 15 of the fixing base 11, and the distal pivotal connecting portions 42 on both sides are pivotally coupled to the pivotal connecting hole 24 of the first distal plate 21, such that the first distal plate 21 can be contracted transversally with respect to the first contractible device 40 for an embedding operation. With the interface transmission of the first contractible device 40, the two left and right first distal plates 21 can be displaced with the same distance. With reference to FIG. 5, the upper and lower symmetrical second distal plates 31 are embedded at both upper and lower sides of the longitudinal operating slot 18, and the second contractible device 50 is installed at the middle of the operating slot 18, and the middle pivotal connecting portion 53 of the second contractible device 50 is pivotally coupled to the positioning pillar 15 of the fixing base 11, and the distal pivotal connecting portions 52 of both sides are pivotally coupled to the pivotal connecting hole 33 of the corresponding second distal plate 31, such that the second distal plate 31 can be contracted longitudinally with respect to the second contractible device 50 for an embedding operation, and the middle transmission of the second contractible device 50 drives the two upper and lower second distal plates 31 to displace with the same distance.

Figure 6:
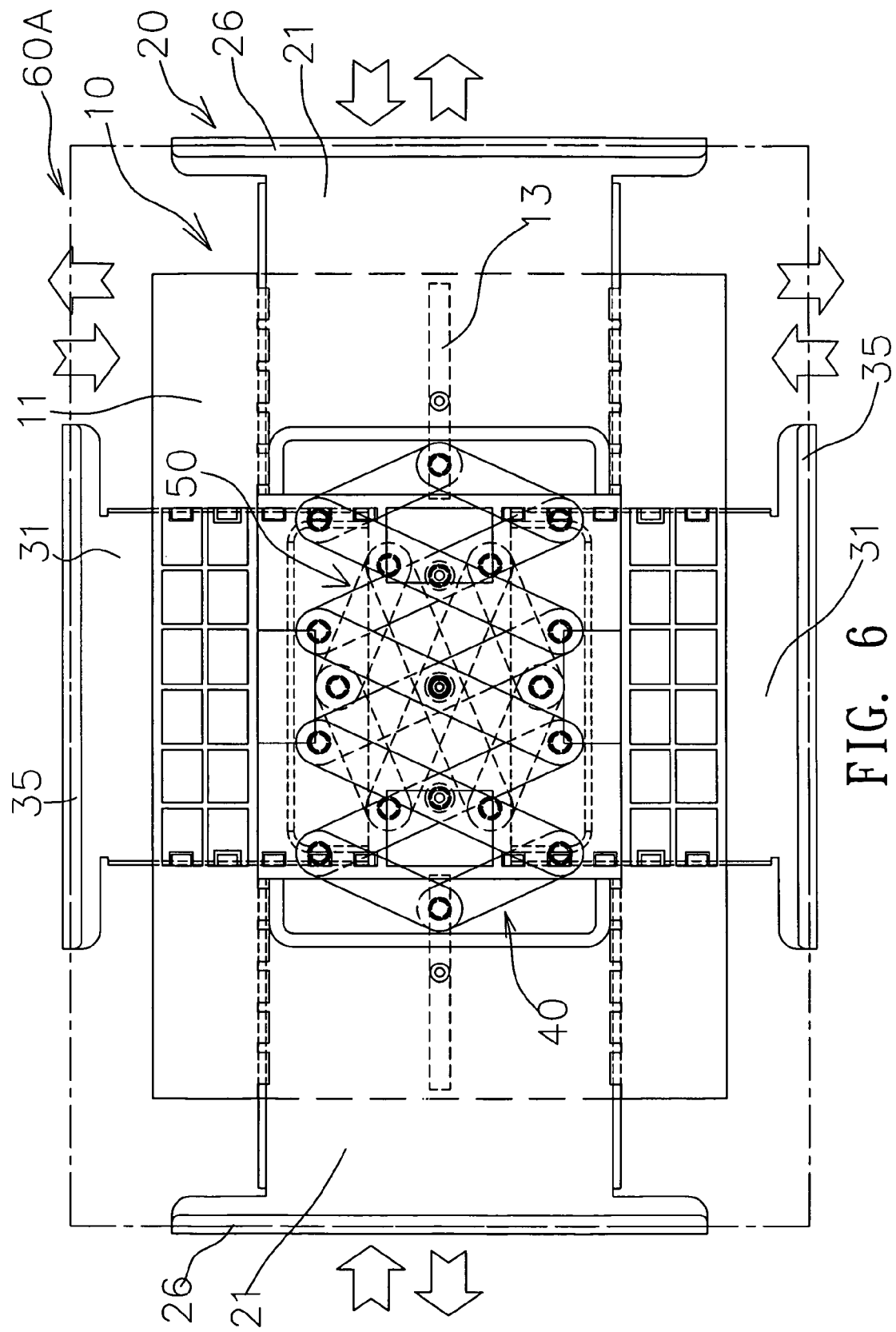
FIG. 6 is a schematic view of operating the present invention.

With reference to FIG. 6 for changing the screen 60 with a larger one in accordance with the present invention, the design of the first distal plate 21 and the second distal plate 31 coupled with the first contractible device 40 and the second contractible device 50 respectively is provided for pulling the first distal plate 21 (or the upper frame plate 26) and the second distal plate 31 (or the upper frame plate 35) to contract and connect the first contractible device 40 and the second contractible device 50 respectively, so that the first distal plate 21 and the second distal plate 31 are extended equidistantly towards the external side in a transversal or longitudinal direction to increase the containing space formed by the upper frame plates 26, 35 for changing to a larger screen 60. Similarly, if it is necessary to change to a smaller screen 60, the aforementioned procedure is operated in a reverse order to decrease the containing space formed by the upper frame plate 26, 35 for the installation of a smaller screen 60.

The link rod type adjustable screen fixing apparatus of the invention is installed into the longitudinal or transversal operating slot by means of the fixing base (at the front or rear side) for installing the distal plate (the pair of first distal plates or second distal plates) and the contractible device (the first contractible device or the second contractible device), such that the distal plate can be contracted or slid in the longitudinal or transversal operating slot, and the size of the containing space can be changed flexibly by the upper frame plates of the distal plate. The invention can fit screens of different sizes, and cover a larger range of generality to prevent the manufacture and inventory issues of fixing bases of different sizes, so as to give better economic benefits to its manufacture.

While the invention has been described by means of specific embodiments, numerous modifications and variations could be made by those skilled in the art without departing from the scope and spirit of the invention set forth in the claims.

What is claimed is:

1. A link rod type adjustable screen fixing apparatus, comprising:
    a fixing base, having mutually perpendicular operating slots disposed on both surfaces of said fixing base respectively;
    at least one distal plate device, having at least one pair of distal plates embedded and positioned in at least one of said operating slots, and slidably moving in said at least one operating slot, and an upper frame plate disposed at an external side of said distal plate;
    at least one contractible device, formed by pivotally coupling a plurality of link rods, and installed in said at least one of operating slots, and a side of said contractible device being pivotally coupled to said distal plate; and
    a containing space, defined by said upper frame plate of said pair of distal plates for installing a screen.

2. The link rod type adjustable screen fixing apparatus according to claim 1, wherein said operating slot is a transversal or longitudinal concave slot.

3. The link rod type adjustable screen fixing apparatus according to claim 1, wherein said at least one of operating slots includes a bar-shaped embedded slide slot disposed separately on both sides of said at least one operating slot.

4. The link rod type adjustable screen fixing apparatus according to claim 1, wherein said operating slot includes a positioning pillar disposed in a center of said operating slot for pivotally coupling and positioning said contractible device.

5. The link rod type adjustable screen fixing apparatus according to claim 1, wherein said fixing base includes a press plate disposed at a position corresponding to a connecting position of said operating slot and extended towards said operating slot.

6. The link rod type adjustable screen fixing apparatus according to claim 1, wherein said distal plate includes a pair of transversal first distal plates and a pair of longitudinal second distal plates, and said contractible device includes a transversally installed first contractible device and a longitudinally installed second contractible device.

7. The link rod type adjustable screen fixing apparatus according to claim 3, wherein said distal plate includes a positioning hole for coupling said embedded slide slot of said fixing base.

8. The link rod type adjustable screen fixing apparatus according to claim 1, wherein said distal plate includes a concave surface disposed at an internal side of said distal plate, and said concave surface includes a pivotal connecting hole for pivotally coupling said contractible device.

9. The link rod type adjustable screen fixing apparatus according to claim 1, wherein said distal plate includes a lower frame plate extended from an external side of said distal plate for coupling said upper frame plate.

10. A link rod type adjustable screen fixing apparatus, comprising:
a fixing base, having two operating slots;
two distal plate devices, having two first distal plates and two second distal plates, and said first distal plate and said second distal plate being disposed at said two operating slots and slidably moving in said two operating slots respectively, and an external side of said first distal plate and said second distal plate having an upper frame plate;
a contractible device, having a first contractible device and a second contractible device disposed in said two operating slots respectively, and said first contractible device and said second contractible device being formed by pivotally coupling a plurality of link rods, and a side of said first contractible device being pivotally coupled to said first distal plate, and a side of said second contractible device being pivotally coupled to said second distal plate; and
a containing space, defined by said upper frame plates of the pair of said first distal plates and said second distal plates, for installing a screen.

11. The link rod type adjustable screen fixing apparatus according to claim 10, wherein said two operating slots are perpendicular to each other, and disposed on both surfaces of said fixing base respectively.

12. The link rod type adjustable screen fixing apparatus according to claim 10, wherein said operating slot includes a bar-shaped embedded slide slot disposed separately on both sides of said operating slot.

13. The link rod type adjustable screen fixing apparatus according to claim 10, wherein said operating slot includes a positioning pillar disposed in a center of said operating slot for pivotally coupling and positioning said first contractible device or said second contractible device.

14. The link rod type adjustable screen fixing apparatus according to claim 10, wherein said fixing base includes a press plate disposed at a position corresponding to a connecting position of said operating slot and extended towards said operating slot.

15. The link rod type adjustable screen fixing apparatus according to claim 12, wherein said first distal plate includes a positioning hole for coupling said embedded slide slot of said fixing base.

16. The link rod type adjustable screen fixing apparatus according to claim 10, wherein said first distal plate and said second distal plate separately include a concave surface disposed on internal sides of said first distal plate and said second distal plate, and said concave surface includes a pivotal connecting hole.

17. The link rod type adjustable screen fixing apparatus according to claim 10, wherein said first distal plate and said second distal plate separately include a lower frame plate extended from external sides of said first distal plate and said second distal plate for coupling said corresponding upper frame plate.

\* \* \* \* \*